COLOR TELEVISION INDEXING SYSTEM

Filed Dec. 11, 1951 2 Sheets-Sheet 1

INVENTORS
ROBERT C. MOORE
RICHARD G. CLAPP
BY Allen V. Hazeltine
ATTORNEY

INVENTORS
ROBERT C. MOORE
RICHARD G. CLAPP
BY
Allen V. Hazeltine
ATTORNEY 2,771,504

COLOR TELEVISION INDEXING SYSTEM

Robert C. Moore, Erdenheim, and Richard G. Clapp, Haverford, Pa., assignors to Philco Corporation, Philadelphia, Pa., a corporation of Pennsylvania Application December 11, 1951, Serial No. 261,014

11 Claims. (Cl. 178—5.4)

The present invention relates to electrical systems and more particularly to cathode-ray tube systems comprising a beam intercepting structure and an indexing member which is arranged in cooperative relationship with the beam intercepting structure and is adapted to produce a signal whose time of occurrence is indicative of the position of the cathode-ray beam on the beam intercepting structure.

The invention is particularly adapted for, and will be described in connection with, a color television image presentation system utilizing a single cathode-ray tube having a beam intercepting, image forming screen member comprising vertical stripes of luminescent materials. These stripes are preferably arranged in laterally-displaced color triplets, each triplet comprising three vertical phosphor stripes which respond respectively, to electron impingement to produce light of different primary colors. The order of arrangement of the stripes may be such that the normally horizontally scanning cathode-ray beam produces red, green and blue light successively. From a color television receiver there may then be supplied three separate video signals, each indicative of a different primary color component of the televised scene, which signals are sequentially utilized to control the intensity of the cathode-ray beam. For proper color rendition, it is then required that, as the phosphor stripes producing each of the primary colors of light are impinged by the cathode-ray beam, the intensity of the beam be simultaneously controlled in response to the contemporaneous value of the video signal representing the corresponding color component of the televised image. However, since the rate at which the beam scans across the phosphor stripes of the screen may vary, due, for example, to non-linearity of the beam deflecting signal or due to a non-uniform distribution of the phosphor stripes on the screen surface, a phase synchronous relationship between the signal applied to the intensity control system of the cathode-ray beam and the scanning of the beam must be continuously reestablished. Such a synchronous relationship may be maintained throughout the scanning cycle by deriving, from the beam intercepting structure, indexing signals indicative of the instantaneous position of the cathode-ray beam upon the image-forming screen, and by utilizing these indexing signals to control the relative phase of the signal applied to the beam intensity controlling system. The said indexing signals may be derived from a plurality of beam responsive signal generating regions of the beam intercepting structure, which regions are disposed in a geometric configuration indicative of the geometric configuration of the color triplets. In one form these regions may be constituted by a plurality of index stripe members arranged on the beam intercepting screen structure so that when the beam scans the screen, the indexing stripes are excited in spaced time sequence corresponding to the scanning of the color triplets and a series of pulses is generated in a suitable output electrode system of the cathode-ray tube.

Such indexing stripes may comprise a material having secondary-emissive properties which differ from the secondary-emissive properties of the remaining portions of the beam intercepting structure. For example, such indexing stripes may consist of a high atomic number material such as gold, platinum or tungsten or may consist of certain oxides such as cesium oxide or magnesium oxide, and the remainder of the beam intercepting structure may be provided with a coating of a material having a detectably different secondary-emissive ratio such as a coating of aluminum, which coating also serves as a light reflecting mirror for the phosphor stripes in accordance with well known practice. With such an arrangement, the indexing signals may be derived from a collector electrode arranged in the vicinity of the screen structure. Alternatively, such indexing stripes may consist of a fluorescent material, such as zinc oxide, having a spectral output in the non-visible light region and the indexing signals may be derived from a suitable photoelectric cell arranged, for example, in a side wall portion of the cathode-ray tube out of the path of the cathode-ray beam and facing the beam intercepting surface of the screen structure.

In order to establish accurately the position of the scanning beam, it has heretofore been the practice to so construct the beam intercepting structure that the number of indexing stripes corresponds to the number of the color triplets. This practice is based on the belief that the phase information carried by the index signal is suitable for synchronously controlling the time phase position of the video signal applied to the beam intensity control system only when the generated indexing signal has the same average frequency as the video signal applied to the intensity control means and hence is derived from indexing stripes having the same periodicity as the color triplets.

It has now been found that certain second order effects are produced by indexing systems utilizing the above noted principles and that the effectiveness of the indexing signal for establishing the beam position and for controlling the time phase position of the applied video signal may be greatly diminished by these second order effects. More particularly, it has been found that since the beam is intensity modulated at the video signal rate as it scans the indexing stripes, and since the amplitude of the indexing signal is a function of the intensity of the beam at the instant it impinges on the successive indexing stripes, the index output circuit of the tube contains components which are representative of the applied video signal. These components have a central frequency at the frequency of the applied video signal and are in part manifested in the indexing circuit by amplitude modulation of the indexing signal. Of greater significance, however, is the fact that since these components have a frequency spectrum which is superimposed on the frequency spectrum of the indexing signal and have the same average frequency value, the contaminating components phase modulate the indexing signal and, to a greater or lesser extent, nullify the phase and/or frequency modulation thereof which is brought about by the variations of the rate at which the beam scans the beam intercepting structure, and which represents the desired information as to the position of the beam.

It is an object of the invention to provide an improved cathode-ray tube system of the type in which the position of an electron beam relative to a beam intercepting member is indicated by a signal produced by a beam responsive signal generating region of the beam intercepting member.

Another object of the invention is to provide a cathode-ray tube system in which the position of an electron beam relative to a beam intercepting member is indicated by an indexing signal and in which a clearly defined indexing signal is generated.

A further object of the invention is to provide a cathode-ray system in which an indexing signal is generated, which signal is substantially free from contaminating influences from a beam intensity controlling signal applied to the beam control system of the tube.

A specific object of the invention is to provide a cathode-ray tube system for color image reproduction in which system faithful color rendition is achieved by maintaining a synchronous relationship between a color video wave and the scanning of a striped phosphor screen by means of an indexing signal generated by the cathode-ray beam.

These and further objects of the invention will appear as the specification progresses.

In accordance with the invention, the foregoing objects are achieved, in a cathode-ray tube system of the character described and comprising a beam intercepting structure having portions thereof arranged in a given geometric configuration and recurring over the surface of the intercepting structure with a given periodicity, by embodying, in said tube system, beam responsive signal generating regions having a geometric configuration indicative of said first geometric configuration and recurring at a periodicity different from, and bearing a fractional relationship to, the periodicity of the said recurring portions. Systems according to the invention further embody means whereby the generated indexing signal, which also has a frequency fractionally related to the frequency at which the said portions are traversed by the beam, is adapted to conform to the requirements established by the periodicity of the said portions. In a specific arrangement of a color television cathode-ray tube system of the type under consideration the beam intercepting member may comprise laterally-displaced color triplets each comprising three phosphor stripes adapted to produce light of different primary colors and further comprising indexing stripes arranged parallel to the color triplets. In accordance with the invention, the periodicity of the indexing stripes is fractionally related to the periodicity of the color triplets, the fractional relationship having a value such that the spectrum of the indexing signal occupies a band of frequencies generally different from the band of frequencies occupied by the video signal. In two preferred arrangements in accordance with the invention, the periodicity of the index stripes is fractionally related to the periodicity of the color triplets by the ratios $$\frac{1}{3} \text{ and } \frac{2}{2n+1}$$

where $n$ is a whole number. The indexing signal so produced, and which is substantially free from components at the video frequency, is then multiplied in frequency by a factor reciprocally related to the said fractional relationship to thereby adapt the indexing signal to the requirements established by the periodicity of the color triplets.

The invention will be described in greater detail with reference to the appended drawings forming part of the specification and in which.

Figure 1:
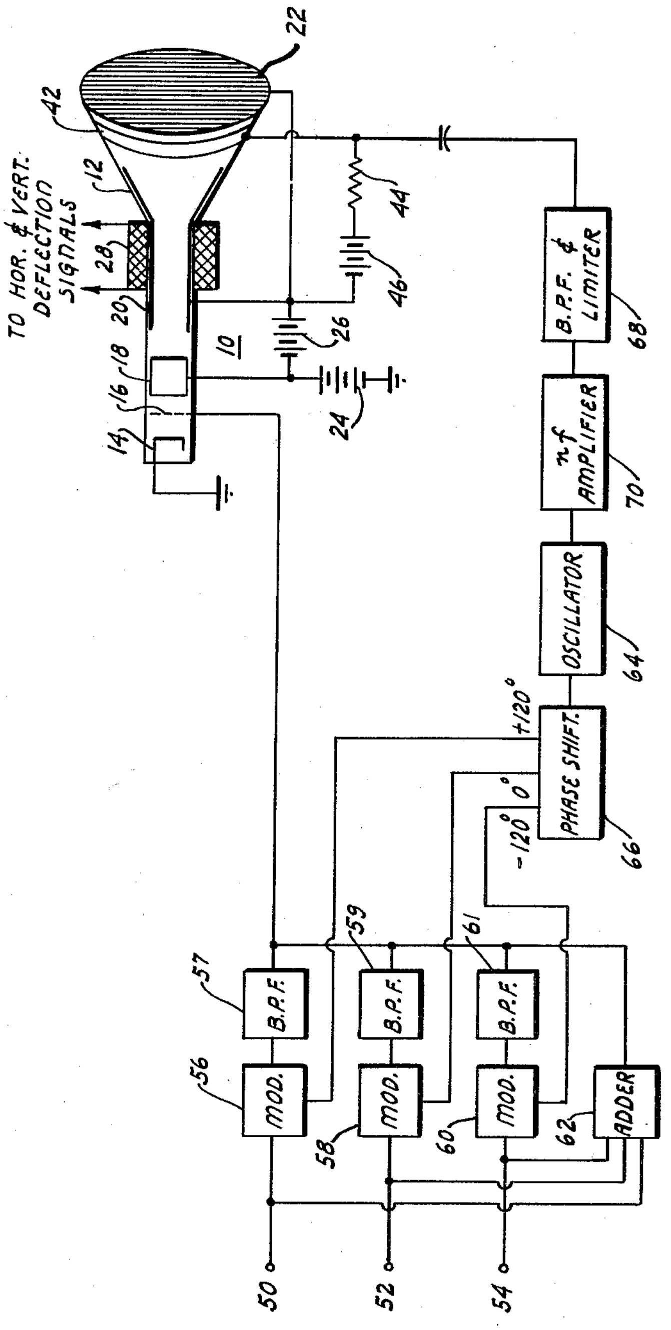
Figure 1 is a block diagram, partly schematic, showing a cathode-ray tube system in accordance with the invention.

Referring to the drawing, the cathode-ray tube system shown in Figure 1 comprises a cathode-ray tube 10 containing, within an evacuated envelope 12, a beam generating and control system comprising a cathode 14, a control electrode 16, a focusing anode 18, and a beam accelerating electrode 20 which may consist of a conductive coating on the inner wall of the envelope 12 and which terminates at a point spaced from the end face 22 of the tube in well known manner. Electrodes 18 and 20 are maintained at their desired operating potentials by suitable voltage sources shown as batteries 24 and 26, the battery 24 having its positive pole connected to the electrode 18 and its negative pole connected to ground, and the battery 26 being connected with its positive pole to electrode 20 and with its negative pole to the positive pole of battery 24. In practice the battery 24 has a potential of the order of 1 to 3 kilovolts, whereas the battery 26 has a potential of the order of 10 to 20 kilovolts. A deflection yoke 28 coupled to horizontal and vertical deflection circuits of conventional design is provided for deflecting the beam across the face plate 22 to form a raster thereon.

Figure 2:
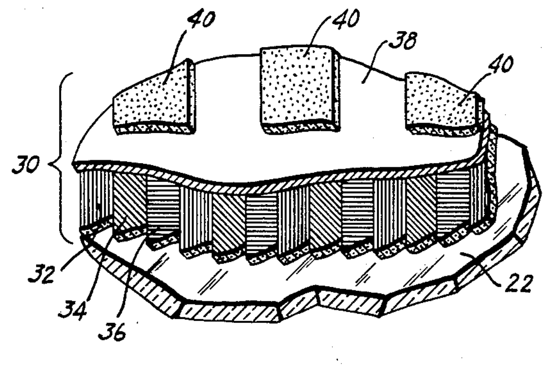
Figure 2 is an enlarged perspective view, partly cutaway, showing a portion of a beam intercepting member which may be used in one preferred embodiment of the cathode-ray tube system of the invention.

The end face 22 is provided with a beam intercepting structure, a preferred form of which is shown as 30 in Figure 2. In the arrangement shown in Figure 2 the structure 30 is formed directly on the face plate 22. However, it should be well understood that the structure 30 may be formed on a suitable light transparent base which is independent of the face plate 22 and may be spaced therefrom. In the arrangement shown, the face plate 22, which in practice consists of glass having preferably uniform transmission properties for the various colors of the visible spectrum, is provided with a plurality of groups of elongated parallelly arranged stripes 32, 34 and 36 of phosphor material which, upon impingement by electrons, fluoresce to produce light of the three different primary colors. For example, the stripe 32 may consist of a phosphor such as zinc phosphate containing manganese as an activator, which upon electron impingement produces red light, the stripe 34 may consist of a phosphor such as zinc orthosilicate, which produces green light, and the stripe 36 may consist of a phosphor such as calcium magnesium silicate containing titanium as an activator, which produces blue light. Each of the groups of stripes may be termed a color triplet and, as will be noted, the sequence of the stripes is repeated in consecutive order over the area of the structure 30. Other suitable materials constituting the phosphor stripes 32, 34 and 36 are well known to those skilled in the art as well as methods of applying the same to the face plate 22, and further details concerning the same are believed to be unnecessary.

The indexing signal is produced by a plurality of signal generating regions of the beam intercepting structure which regions are disposed in a geometric configuration indicative of the geometric configuration of the color triplets. In the arrangement shown, the indexing signal is produced by utilizing index stripes of a given secondary-emissive ratio differing from the secondary-emissive ratio of the remainder of the beam intercepting structure, and for this purpose the structure 30 comprises a thin electron permeable conducting layer 38 of low secondary-emissivity. The layer 38 is arranged on the phosphor stripes 32, 34 and 36 and preferably further constitutes a mirror for reflecting light generated at the phosphor stripes. Other metals capable of forming a coating similar to aluminum, and having a secondary-emissive ratio different from that of the indexing stripes may also be used. Such other metals may be for example, magnesium or beryllium.

Arranged on layer 38 are indexing stripes 40 consisting of a material having a secondary-emissive ratio detectably different from that of the material of coating 38. Stripes 40 may be of gold or of other high atomic number metal such as platinum or tungsten, or may be of an oxide, such as magnesium oxide as previously pointed out.

The index stripes 40 are arranged in a geometric configuration indicative of the geometric configuration of the phosphor triplets so that, as the cathode-ray beam scans the beam intercepting structure of the cathode-ray tube, there is produced, in an output system of the tube, an indexing signal indicative of the position of the beam relative to the phosphor stripes. In the specific arrangement shown in Figure 2, the stripes 40 are arranged parallel to the phosphor stripes and, in accordance with the invention as later to be more fully referred to, the periodicity of the stripes 40 bears a fractional relationship to the periodicity of the color triplets.

The beam intercepting structure so constituted is connected to the positive pole of the battery 26 by means of a suitable lead attached to the coating 38.

Interposed between the accelerating electrode 20 and the beam intercepting structure 30 is an output electrode 42 consisting of a ring-shaped conductive coating, for example of graphite or silver, on the wall of the envelope. Electrode 42 is energized through a load resistor 44 by a suitable source 46, shown as a battery. The source 46 may have a potential of the order of 3 kilovolts.

For the reproduction of a color image on the face plate of the cathode-ray tube there are provided color signal input terminals 50, 52 and 54 which are supplied from a television receiver with separate signals indicative of the red, green and blue components of the televised scene, respectively. The system then operates to effectively convert these three color signals into a wave having the color information arranged in time reference sequence so that the red information occurs when the cathode-ray beam impinges the red stripes 32 of the beam intercepting structure 30, the green information occurs upon impingement of the green stripes 34 and the blue information when the blue stripes 36 are impinged.

The conversion of the color signals into a wave having color information arranged in the time reference sequence above noted, may be achieved by a modulation system suitably energized by the respective signals and by appropriately phase related modulation signals. In the arrangement specifically shown, the desired conversion is effected by means of sine wave modulators 56, 58 and 60 in conjunction with an adder 62. Modulators 56, 58 and 60 may be of conventional form and may each consist, for example, of a dual grid thermionic tube, to one grid of which is applied the color signal from the respective terminals 50, 52 and 54 and to the other grid of which is applied an individual modulation signal. The modulation signals are derived from an oscillator 65 through a phase shifter 66; the latter being adapted to produce, by means of suitable phase shifting networks, three modulation voltages appropriately phase displaced. In the arrangements specifically described, wherein the phosphor stripes 32, 34 and 36 are substantially uniformly distributed throughout the width of each color triplet, the modulation voltages from the phase-shifter 66 bear a 120° phase relationship as shown.

The individual waves produced at the outputs of the modulators are sine waves, each amplitude modulated by the color signal applied to the respective modulator and each having a phase relationship determined by the particular modulation signal applied. The three modulators are coupled with their outputs in common whereby the three waves are combined to produce a resultant wave having a frequency the same as that of oscillator 64 and having amplitude and phase variations proportional to the variations of the amplitudes of the color signals at terminals 50, 52 and 54.

The frequencies of the waves generated by the modulators 56, 58 and 60 are established by the oscillator 64 and determined by the rate of scanning the color triplets of the beam intercepting structure 30. For example, when the rate of scanning the color triplets has an average value of 10 million per second, as determined by the scanning frequency applied to the horizontal deflection coil of the deflection system 28 and by the number of effective color triplets contained on the surface of the face plate 22, the oscillator 64 has a nominal frequency of 10 mc./sec. and similarly the frequency of the waves from the modulators and the resultant wave produced by their combination will have this nominal frequency value.

Each of the color signals applied to the input terminals of modulators 56, 58 and 60, will, in general, include a reference level component definitive of brightness. While each of the modulators above specifically described normally transmits this reference level component to its output, it is preferable to suppress the individual reference level components from the modulators, for example by means of band-pass filters 57, 59 and 61 respectively, and to process the brightness information in a separate channel. Accordingly, in the system shown in Figure 1, the three color signals are combined in proper proportions in the adder 62 to yield a single signal representative of the over-all brightness of the image to be reproduced, and this signal is in turn combined with the outputs of the modulators. The reference level component derived from the adder 62 and defining the brightness of the elements of the image to be reproduced is, in general, a low frequency wave with an extended spectrum. In a typical case this brightness component is a signal having frequencies extending from substantially 30 c./sec. to 3 mc./sec.

There is thus applied to the control electrode 16 a composite signal having the desired video information and comprising a large bandwidth low frequency component which, in a typical case, has a spectrum extending from approximately 0 to approximately 3 mc./sec. and further comprising a high frequency component having a carrier frequency approximating the rate of scanning the color triplets and having a spectrum spaced from the spectrum of the first component, i. e., a spectrum arranged about a frequency of 10 mc./sec. The spectrum of the latter component is determined by the color information contained therein and by the band-pass characteristics of the filters 57, 59 and 61 and in general the spectrum of the signal does not extend more than about ±1 mc./sec. from the average frequency value.

When such a signal is applied as an intensity control quantity for the cathode-ray beam in proper phase time sequence to the scanning of the color triplets, it will cause the phosphor stripes of the consecutively scanned color triplets to be excited to brightness values corresponding to the intensities of the primary color components of the consecutive image elements to be reproduced. In scanning the phosphor triplets, the so varied beam also excites the indexing stripes 40 (see Figure 2) so that, as each stripe is intercepted, there is generated, across the load resistor 44, a voltage pulse having an amplitude proportional to the intensity of the beam and to the secondary electron emissivity of the material of the indexing stripes. The pulses so produced exhibit a frequency spectrum, one component of which is determined by the frequency of the intensity variations of the beam as determined by the applied video signal and another component of which is determined by the rate at which the beam scans the indexing stripes. This latter component carries the desired information indicative of the position of the beam and, when the spectra of the two components are superimposed, as has been found to occur when the number of the indexing stripes is equal to the number of the color triplets, the desired indexing information is contaminated by the video signal information so that an absolute indication of the beam position by the indexing signal cannot readily be obtained.

In accordance with the invention, the foregoing difficulty is obviated by establishing a fractional relationship between the number of index stripes 40 and the number of color triplets so that the spectra of the two components above discussed occupy generally different frequency bands and preferably so that the spectrum of the component of the generated signal indicative of the desired indexing information occupies a position between the spaced spectra of the low frequency and of the high frequency components of the video signal.

Figure 4:
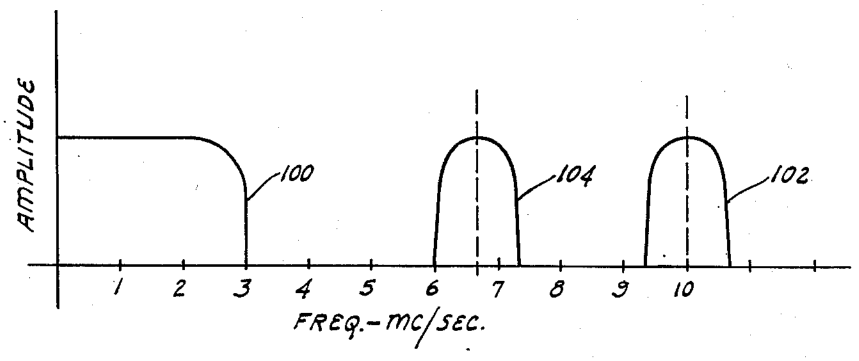
Figure 4 is a graph showing one distribution of the frequency spectra in a system in accordance with the invention.

These criteria are fulfilled by reason of the fact that, in the beam intercepting structure shown in Figure 2, the number of index stripes 40 is chosen to be equal to ⅔ of the number of color triplets so that the carrier frequency of that component of the generated signal carrying the desired index information is equal to ⅔ of the frequency value of the carrier frequency of the high frequency component of the video signal. When using this fractional relationship the spectrum of the desired indexing information falls between the spectra of the two components of the video sign as shown in Figure 4. In Figure 4 the low frequency component of the video signal has been indicated by the curve 100 and, as will be noted, this component occupies a spectrum extending from zero to 3 mc./sec. The high frequency component of the video signal is indicated by the curve 102 and this component has a spectrum arranged about a carrier frequency of 10 mc./sec. as established by the oscillator 64 (see Figure 1) and by the requirements of the image reproducing screen of the cathode-ray tube 10. In the scanning of the indexing stripes 40, a signal component having a spectrum as also shown by the curve 102 and due to the intensity variations of the beam produced by the high frequency component of the video signal, will appear across the load impedance 44 (see Figure 1). Since this component carries no indexing information, its presence in the indexing circuit is undesirable. By fractionally relating the indexing stripes and the color triplets in the ratio of ⅔ so that the desired indexing information occupies a spectrum which is separate from the spectrum 102 and preferably also separate from the spectrum 100, as shown by the curve 104, the indexing information may be readily separated from any contaminating influences by relatively simple means such as a filter 68 having a pass-band characteristic as illustrated by the curve 104. The spectrum of the indexing information is arranged about a carrier frequency of 6.67 mc./sec. as determined by the scanning rate and by the number of indexing stripes, and the extent of the spectrum is determined by the phase (and/or frequency) variations produced by non-uniformities in the scanning velocity and by non-uniformities in the disposition of the indexing stripes 40. Since the indexing stripes 40 are arranged in a geometric configuration indicative of the geometric configuration of the color triplets, the spectrum of the indexing information is correspondingly determined by non-uniformities in the disposition of the color triplets.

Band-pass filter 68 may also include an amplitude limiter by means of which any amplitude modulation, which may appear on the desired indexing signal due to the low frequency component of the video wave, is removed.

The indexing signal so generated is utilized to produce the desired synchronism between the contemporaneous value of the video signal applied to the control electrode 16 and the scanning of the phosphor stripes. This synchronism is achieved by appropriately controlling the time phase position of the composite wave generated by the modulators 56, 58 and 60 by varying the relative phase of the oscillator 64 in consonance with the phase (and/or frequency) variations of the 6.67 mc./sec. indexing signal produced by the indexing stripes. In order to adapt the indexing signal at 6.67 mc./sec. to the oscillator 64 operating at 10 mc./sec., the indexing signal is subjected to frequency multiplication in a ratio inverse to the ratio of the periodicities of the indexing stripes and the color triplets, for example by means of a frequency multiplier and amplifier 70.

Frequency multiplier and amplifier 70 may be of conventional form and is adapted to multiply the frequency of the input signal thereof to a frequency value equal to the color triplet frequency. In the case of an index frequency at ⅔ of the color triplet frequency as above specifically described, the amplifier 70 may contain a frequency multiplier adapted to triple the frequency of the signal applied thereto, followed by a frequency divider adapted to divide the tripled frequency by a factor of two. Amplifier 70 may be further characterized by sufficient gain to amplify the indexing signals applied thereto to a conveniently usable level.

The oscillator 64, which is adapted to produce a wave of given frequency with a time-phase position as determined by the output signal of the frequency multiplier and amplifier 70, may conform to well known practice. A suitable form thereof is described in the copending application of Joseph C. Tellier, Serial No. 197,551, filed November 25, 1950.

Figure 3:
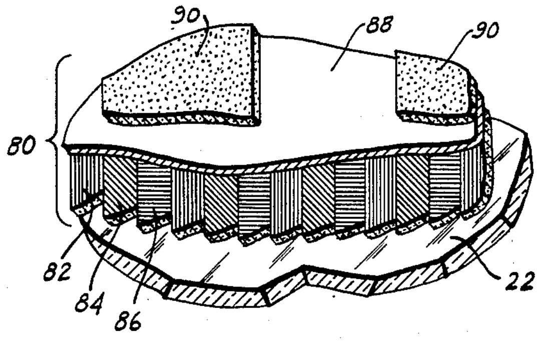
Figure 3 is an enlarged perspective view, partly cutaway, of a portion of a beam intercepting member which may be used in another preferred embodiment of the cathode-ray tube system of the invention.

Other fractional relationships between the periodicity of the indexing stripes and the periodicity of the color triplets may be used, in accordance with the invention, to produce an index signal spectrum which is individual and readily separable from the spectra of the components of the video signal. For example, as shown in Figure 3, the periodicity of the index stripes may be ⅓ the periodicity of the color triplets to achieve this desired result. The beam intercepting structure shown in Figure 3 and indicated by the numeral 80, comprises phosphor stripes 82, 84 and 86 of the three primary colors, consecutively arranged on the face plate 22 in the same manner as above-described in connection with Figure 2, a coating 88 of a material having a low secondary electron emissivity similar to the coating 38 of Figure 2, and indexing stripes 90 of a secondary electron emissive material which are similar to the stripes 40 of Figure 2 but which are arranged at a periodicity equal to ⅓ the periodicity of the color triplets formed by the phosphor stripes 82, 84 and 86.

When the beam intercepting structure of Figure 3 is used in the system of Figure 1, the indexing information will be contained in a spectrum arranged about a frequency equal to ⅓ the frequency of the color video component derived from the modulators 56, 58 and 60, i. e., at a frequency of approximately 3.33 mc./sec. Accordingly, a frequency multiplier and amplifier 70 is used which is adapted to triple the frequency of the signal applied to the input thereof. A corresponding change is made in the band-pass filter and limiter 68 to adapt its pass band to the spectrum of the desired indexing information.

Fractional relationships other than those above specifically described may be used and the limit of the range of values is determined in part by the following considerations. As the fractional relationship decreases in value, the spectrum of the desired indexing information shifts progressively to lower frequencies. In general, it is preferable that the spectrum of the low frequency brightness component of the video signal and the spectrum of the desired indexing signal be completely separate. However, a certain amount of overlap may be tolerated, the amount of permissible overlap being determined by the amplitude of the signal components of the brightness information relative to the amplitude of the overlapping signal components of the indexing information. As a rule, when the brightness information has a spectrum extending to 3 mc./sec., the signal components thereof at frequencies greater than 1 mc./sec. have relatively small intensity values, so that, if desired, the spectrum of the index information may be permitted to extend approximately down to this frequency value without causing serious contamination of the index information by the brightness signal. The upper limit of the fractional relationship is established by the selected carrier frequency of the high frequency component of the video signal, the bandwidth of the spectrum of this component and the bandwidth of the spectrum of the indexing signal. In the case of a video signal having a high frequency component arranged about a frequency of 10 mc./sec. as above specifically described, having a bandwidth of the order of 2 mc./sec., and wherein the desired indexing signal has a bandwidth of the order of 1 mc./sec., the carrier frequency of the index signal is preferably limited to a maximum value of 8.5 mc./sec. Under the conditions above specifically set out, the fractional relationship between the periodicity of the index stripes and the periodicity of the color triplets may have a range between approximately .15 and .85.

The preferred fractional relationship of ⅔, as shown in Figure 2, represents one value of the relationship $$\frac{2}{2n+1}$$

which has been found particularly suitable for the system of the invention. It has been found that, when this fractional relationship is used, a further advantage is achieved in that a first order cancellation of the sine wave component of the video signal in the index signal channel is obtained. More particularly, when this specific relationship is used, the effect of the video signal on the index signal output from a given index stripe is balanced by an equal and opposite effect of the video signal on the index signal output from the next adjacent index stripe.

Furthermore, it has been found that the geometrical distribution of the index stripes may be made to influence the generation of undesirable components in the indexing signal circuits of the tube. In this connection, it has been found that by making the width of the index stripes equal to the spacing between the stripes, as shown in Figures 2 and 3, a substantially square wave indexing signal is produced, which signal is substantially free from even order harmonics. By so eliminating even order harmonics of the index signal the possibility of beat notes in the index circuit with video information is thereby reduced.

While we have described our invention by means of specific examples and in specific embodiments, we do not wish to be limited thereto for obvious modifications will occur to those skilled in the art without departing from the spirit and scope of the invention.

What we claim is:

1. A cathode ray tube system comprising a cathode ray tube having a source of an electron beam, control means for varying the intensity of the beam and a beam intercepting member, said beam intercepting member comprising a plurality of first portions arranged in a given geometric configuration and adapted to produce a given response upon electron impingement, said first portions recurring over the surface of said intercepting member at a given periodicity, said member further comprising a plurality of second portions arranged in a second given configuration indicative of said first configuration and adapted to produce a second given response different from said first response upon electron impingement, said second portions recurring over the surface of said member at a periodicity fractionally related to the periodicity of said first portions by the value $$\frac{2}{2n+1}$$

where $n$ is a whole number greater than zero, means for producing a wave having variations indicative of desired variations of the response of said first portions and having a component with a frequency spectrum arranged about a frequency having a value substantially proportional to the number of said periodically arranged first portions, means for applying said wave to said beam intensity control means, means for scanning said beam across said first and second portions thereby to energize said first portions proportionally to variations of the intensity of said beam produced by said wave and to energize said second portions, means coupled to said beam intercepting member and responsive to the energization of said second portions by said scanning beam for producing a second wave comprising a component having a frequency spectrum as determined by the rate of scanning said periodically arranged second portions, and means coupled to said second wave producing means for selectively deriving said component of said second wave.

2. A cathode-ray tube system as claimed in claim 1 wherein said first wave comprises a first component having a frequency spectrum extending to a given maximum frequency value and further comprises a second component having a frequency spectrum of given bandwidth and spaced from said first spectrum, and wherein the fractional relationship of the periodicity of said first and second portions has a value at which the spectrum of said second wave is arranged intermediate to the said spectra of the said components of said first wave.

3. A cathode-ray tube system as claimed in claim 2 wherein the frequency spectrum of said second wave and the frequency spectrum of said second component of said first wave are mutually exclusive.

4. A cathode-ray tube system as claimed in claim 1 further comprising means responsive to said selectively derived component of said second wave to vary the time phase position of the said variations of said first wave.

5. A cathode-ray tube system as claimed in claim 1 wherein the periodicity of said second portions is equal to two-thirds the periodicity of said first portions.

6. A cathode ray tube system for producing a color television image, comprising a cathode ray tube having a source of an electron beam, control means for varying the intensity of said beam and a beam intercepting member, said intercepting member comprising consecutively arranged first portions recurring over the surface of said member at a given periodicity, each of said portions comprising a plurality of stripes of fluorescent material adapted to produce light of different colors in response to electron impingement, said beam intercepting member further comprising second portions spaced apart and arranged substantially parallel to said stripes in a geometric configuration indicative of the position of said stripes and comprising a material having a given response characteristic different from the response characteristic of said first portions upon electron impingement, said second portions recurring over the surface of said member at a periodicity fractionally related to the periodicity of said first portions by the value $$\frac{2}{2n+1}$$

where $n$ is a whole number greater than zero, means for producing a wave having variations indicative of desired variations of said first portions, said wave comprising a first component having a frequency spectrum extending to a given maximum frequency value and comprising a second component having a frequency spectrum arranged adjacent to and spaced from said maximum frequency value and arranged about a frequency having a value proportional to the number of said first portions, means for applying said wave to said beam intensity control means, means for scanning said beam across the said beam intercepting member thereby to energize said first portions proportionally to variations of the intensity of said beam produced by said wave and to energize said second portions, means coupled to said beam intercepting member and responsive to the energization of said second portions by said scanning beam for producing a second wave comprising a component having a frequency spectrum arranged about a second frequency having a value determined by the rate of scanning said periodically arranged second portions, means coupled to said second wave producing means for selectively deriving said component of said second wave, and means responsive to said component of said second wave for varying the time phase position of the variations of said first wave.

7. A cathode-ray tube system as claimed in claim 6, wherein said means to vary the time phase position of the variations of said first wave comprise means to multiply the value of the frequency of the said component of said second wave by a factor reciprocally related to the fractional relationship between the periodicity of said first portions and the periodicity of said second portions.

8. A cathode-ray tube system as claimed in claim 6 wherein the periodicity of said second portions is equal to two-thirds the periodicity of said first portions.

9. A cathode-ray tube system as claimed in claim 6 wherein said second portions are stripe-like portions having a width substantially equal to the spacing between consecutive stripe portions.

10. A cathode ray tube system for producing a color television image, comprising a cathode ray tube having a source of an electron beam, control means for varying the intensity of said beam and a beam intercepting member, said intercepting member comprising a plurality of consecutively arranged first portions, each of said portions comprising a plurality of stripes of fluorescent material, each of said stripes producing light of a different color in response to electron impingement, said beam intercepting member further comprising a plurality of second stripe-like portions spaced apart and arranged substantially parallel to said first portions in a geometric configuration indicative of the position of said color stripes and comprising a material having a given response different from the response of said first portions upon electron impingement, the periodicity of said second portions being fractionally related to the periodicity of said first portions by the value $$\frac{2}{2n+1}$$

where $n$ is a whole number greater than zero, means for periodically scanning said beam across said beam intercepting member thereby to energize said first and second portions, a source of a first wave having variations indicative of desired variations of the response of said first portions, said wave comprising a first component having a frequency spectrum extending to a given maximum frequency value and comprising a second component having a frequency spectrum arranged about a subcarrier wave having a frequency equal to the rate of scanning said first portions, the spectrum of said second component being arranged adjacent to and spaced from the maximum frequency value of said first component, means for applying said wave to said beam intensity control means, means coupled to said beam intercepting member and responsive to the energization of said second portions by said scanning beam for deriving from said beam intercepting member a second wave comprising a component having a frequency equal to the rate of scanning said beam over said second portions and having a frequency spectrum as determined by variations in the rate of scanning said second portions by said beam, means for selectively deriving said second component from said second wave, means for multiplying the frequency of said derived second component by a value reciprocally related to said fractional relationship thereby to produce a control wave having a frequency equal to the frequency of said subcarrier wave, and means for applying said control wave to said source of said first wave thereby to vary the time phase position of said subcarrier wave.

11. A cathode-ray tube system comprising a cathode-ray tube having a source of an electron beam, control means to vary the intensity of said beam, and a beam intercepting member, said beam intercepting member comprising a plurality of first portions arranged in a given geometric configuration and adapted to produce a given response upon electron impingement, said first portions recurring over the surface of said intercepting means at a given periodicity, said member further comprising a plurality of second portions arranged in a second given configuration indicative of said first configuration and adapted to produce a second given response different from said first response upon electron impingement, said second portions recurring over the surface of said intercepting means at a second given periodicity and being in the form of spaced stripes having a width substanitally equal to the spacing therebetween, a source of a wave having variations indicative of desired variations of said first response and having a component with a frequency spectrum arranged about a frequency having a value substantially proportional to the number of said periodically arranged first portions, means for applying said wave to said control means, means for scanning said beam across said first and second portions to thereby energide said first portions proportionally to variations of the intensity of said beam produced by said wave and to energize said second portions, means coupled to said beam intercepting structure and responsive to the energization of said second portions for producing a second wave comprising a component having a frequency determined by the rate of scanning said beam over the said consecutively arranged second portions, and means coupled to said last mentioned means for selectively deriving said component of said second wave.

UNITED STATES PATENTS

References Cited in the file of this patent

| | | |
|---|---|---|
| 2,122,095 | Gabor | June 28, 1938 |
| 2,178,238 | Massa et al. | Oct. 31, 1939 |
| 2,186,393 | Ring et al. | Jan. 9, 1940 |
| 2,343,825 | Wilson | Mar. 7, 1944 |
| 2,454,652 | Iams et al. | Nov. 23, 1948 |
| 2,463,535 | Hecht | Mar. 8, 1949 |
| 2,490,812 | Huffman | Dec. 13, 1949 |
| 2,530,431 | Huffman | Nov. 21, 1950 |
| 2,545,325 | Weimer | Mar. 13, 1951 |
| 2,631,259 | Nicoll | Mar. 10, 1953 |